US007706940B2

(12) United States Patent
Itatsu

(10) Patent No.: US 7,706,940 B2
(45) Date of Patent: Apr. 27, 2010

(54) DRIVE RECORDER SYSTEM

(75) Inventor: Takao Itatsu, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 12/117,346

(22) Filed: May 8, 2008

(65) Prior Publication Data

US 2008/0288136 A1 Nov. 20, 2008

(30) Foreign Application Priority Data

May 16, 2007 (JP) ............................ 2007-130139

(51) Int. Cl.
*G06F 19/00* (2006.01)

(52) U.S. Cl. ........................................................ 701/35

(58) Field of Classification Search .................. 701/35, 701/36; 340/438; 348/148; 713/193
See application file for complete search history.

(56) References Cited

U.S. PATENT DOCUMENTS

2002/0183905 A1 12/2002 Maeda et al.
2007/0067079 A1* 3/2007 Kosugi ........................ 701/35
2008/0072072 A1* 3/2008 Muraki et al. ............... 713/193

FOREIGN PATENT DOCUMENTS

JP 2002-362435 12/2002

* cited by examiner

*Primary Examiner*—Kim T Nguyen
(74) *Attorney, Agent, or Firm*—Brinks Hofer Gilson & Lione

(57) ABSTRACT

A drive recorder system capable of ensuring a fixed level of security of drive recorder information at a comparatively low cost is provided. The drive recorder system includes an on-vehicle camera capable of constantly obtaining an image of the surroundings of a subject vehicle, an HDD, a terrestrial digital broadcast receiving apparatus in which content is managed in compliance with a copyright protection technology, and a controller. Control is performed so that content protection prescribed by the terrestrial digital broadcast receiving apparatus is performed on image data obtained by the on-vehicle camera and is recorded and stored in the HDD.

15 Claims, 3 Drawing Sheets

DRIVE RECORDER SYSTEM

RELATED APPLICATION

The present application claims priority to Japanese Patent Application Number 2007-130139, filed May 16, 2007, the entirety of which is hereby incorporated by reference.

BACKGROUND

1. Technical Field

The present invention relates to a system having a drive recorder function and, more particularly, to a drive recorder system adapted to ensure security of drive recorder information recorded on a recording medium.

2. Description of the Related Art

Airplanes are equipped with an apparatus for recording the operation state of the airplane, which is called a flight recorder, and the data regarding the recorded operation state of the airplane is utilized as important evidence when investigating the cause of an airplane accident. In most cases, the investigation of the cause of an automobile traffic accident has hitherto relied on only the statements of individuals involved in and witnesses to the accident, these statements sometimes differing, and to date, verification has taken a lot of time.

To deal with the above problems, rather than relying on witness statements at the time an accident occurs, a "drive recorder" (on-vehicle image recording apparatus) for recording images for several tens of seconds before and after an accident has been conceived. Most manufactured drive recorders are disposed in the vicinity of the rear view mirror and on the front windscreen inside a car. As configurations of such drive recorders, types of drive recorder (integral types) in which parts of a CCD camera and a recorder are integrally configured and types of drive recorder (separation types) in which a CCD camera and a recorder are separated have been put onto the market.

For example, in a system configuration of the related art as shown in FIG. 3, during driving, a subject vehicle and the surrounding state are constantly recorded (using an on-vehicle camera 1 and a GPS receiver 2). When a fixed shock is applied to a vehicle due to an accident (rear-end collision, crash, etc.) or a violent and risky driving operation (sudden braking, sudden steering-wheel operation, etc.), a vehicle sensor 6 (an acceleration sensor, a shock sensor, etc.) detects the shock, and stores, as data, the video (containing the running speed, and in response to the detection, the degree of shock) before and after the detection.

Examples of technologies associated with the related art include a technology in which, as disclosed in Unexamined Patent Application Publication No. US2002/0183905, vehicle data inside a volatile memory is encrypted and is recorded and stored in the non-volatile memory before, upon, and after the collision of a vehicle.

As described above, in the drive recorder system, when considering the use thereof as evidence in proceedings related to an automobile traffic accident, it is necessary that a fixed level of security of stored data (drive recorder information) is ensured. For this reason, as exemplified in FIG. 3, there has been a need to install functions, such as authentication, prevention of tampering, and the like of recorded data via a data encryption process (local encryption from a controller 3 to a removable medium 5).

However, in the related art, when data (encrypted drive recorder information) stored on a removable medium 5 is to be displayed on the screen of a personal computer (PC) 7, specialized analysis software is required. Furthermore, the specialized analysis software is comparatively expensive and has specifications unique to each company. That is, in order to use encrypted drive recorder information, specialized analysis software for each specification of each company needs to be used, presenting a problem in that there is no versatility and also a high cost is incurred.

SUMMARY OF THE INVENTION

The present invention has been made in view of the problems of the related art. An object of the present invention is to provide a drive recorder system capable of ensuring a fixed level of security of drive recorder information at a comparatively low cost.

In order to solve the above-described problems of the related art, according to an embodiment of the present invention, there is provided a drive recorder system including: an on-vehicle camera configured to constantly obtain an image of the surroundings of a subject vehicle; a recording medium; an apparatus with a content protection function in which content is managed in compliance with a copyright protection technology; and a controller configured to perform control so that content protection prescribed by the apparatus with a content protection function is performed on image data obtained by the on-vehicle camera, and the image data is recorded and stored on the recording medium.

Under the control of a controller, image data obtained by an on-vehicle camera, on which content protection is performed in compliance with a copyright protection technology prescribed by an apparatus with a content protection function (for example, a terrestrial digital broadcast receiving apparatus), is recorded and stored as drive recorder information on a recording medium. As a result, it is possible to guarantee a fixed level of security of the recorded and stored drive recorder information. Furthermore, when compared with the case of the related art (FIG. 3) in which a specialized encryption method is used, the actual implementation is possible within the standard of such an apparatus with a content protection function. Therefore, considerable maintenance and management on the manufacturer side is not necessary, thereby contributing to a reduced cost.

DETAILED DESCRIPTION OF THE PREFERRED EMBODIMENTS

A preferred embodiment of the present invention will now be described below with reference to the attached drawings.

Figure 1:
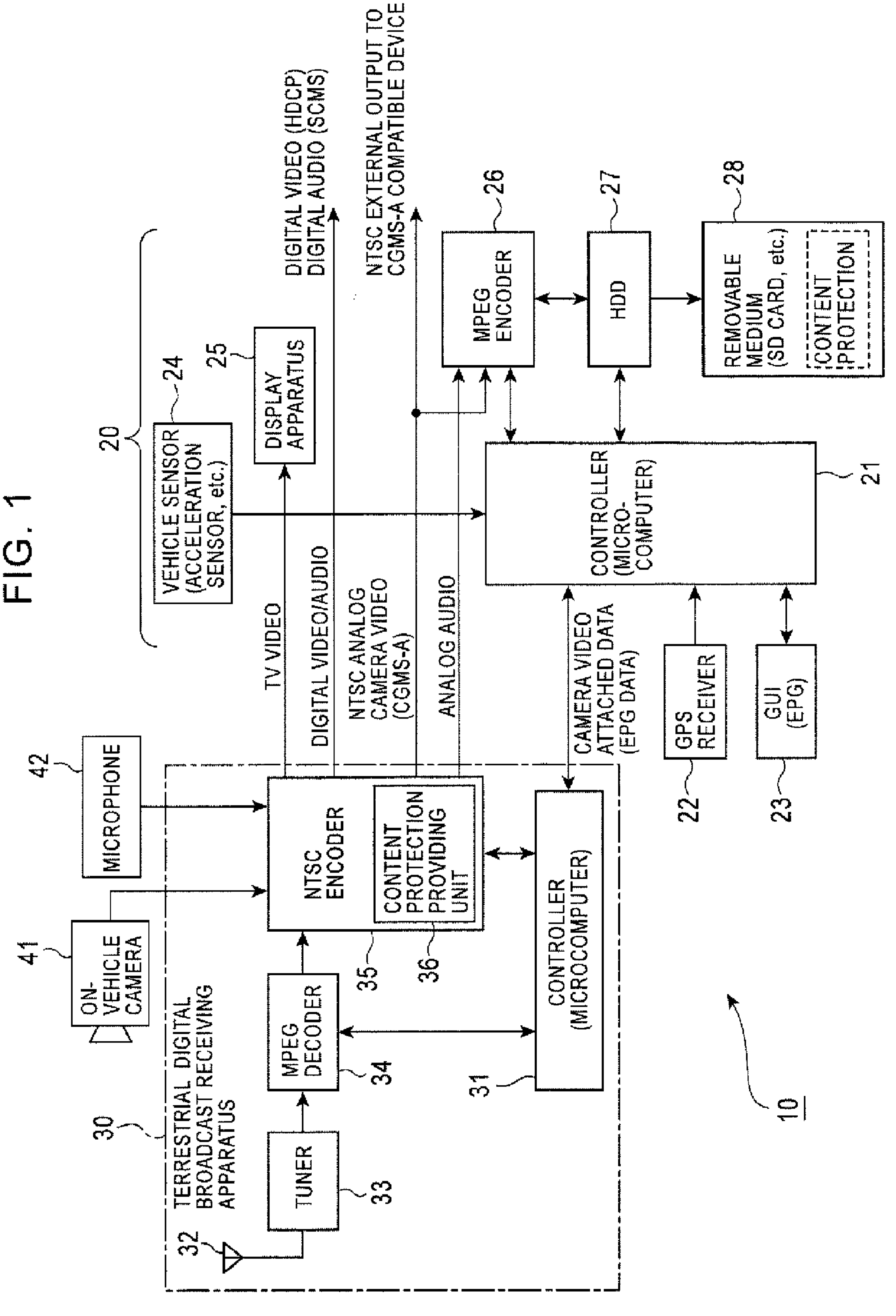
FIG. 1 is a block diagram showing the configuration of a drive recorder system according to an embodiment of the present invention.

FIG. 1 shows, in a block diagram, the configuration of a drive recorder system according to an embodiment of the present invention. This embodiment shows an example in which a drive recorder system according to the present invention is incorporated in such a manner as to be shared with part of a navigation system.

A drive recorder system 10 according to this embodiment is basically configured to include a navigation system 20, a terrestrial digital broadcast receiving apparatus 30, an on-vehicle camera 41, and a microphone 42, the on-vehicle camera 41 and the microphone 42 being source devices for obtaining drive recorder information. In the example shown in FIG. 1, for simplicity of description, only the configuration of the portions associated with the present invention are shown.

The on-vehicle camera 41 is an example of image-capturing means for obtaining drive recorder information. As an image-capturing device thereof, a CCD (Charge Coupled Device) is used, an appropriate number of which are disposed at suitable places throughout a vehicle. For example, four on-vehicle cameras 41 may be disposed at the front side (the upper portion of a bumper) of the vehicle, at the back side (the upper portion of the bumper), at the right side (the lower portion of a rear-view mirror), and the left side (the lower portion of the rear-view mirror). Each of the on-vehicle cameras 41 has a wide-angle lens such as a fisheye lens and is disposed in such a manner that each lens is directed slightly downward in the horizontal direction. As a result, each on-vehicle camera 41 can obtain images in a wide-angle range (ideally in an image-capturing range of 180□) and can capture images of the surroundings of the subject vehicle, including a portion (car body) of the subject vehicle. Each on-vehicle camera 41 is assumed to constantly obtain images (information) of the surroundings of the vehicle while the system 10 is operating.

A microphone 42 is an example of a sound collection means for obtaining drive recorder information, an appropriate number of which are disposed at suitable places throughout the vehicle, For example, four microphones 42 may be disposed near the right and left ends of the front side (the upper portion of the bumper) of the vehicle and near the right and left ends of the back side (the upper portion of the bumper) of the vehicle, so that sound which is generated in the surroundings of the subject vehicle can be detected.

As shown in FIG. 1, a navigation system 20 includes a controller 21, a GPS receiver 22, a graphical user interface (GUI) 23 for inputting an instruction from a user via a pointing device such as a mouse, a vehicle sensor 24, a display apparatus 25, an MPEG encoder 26, a hard disk drive (HDD) 27 serving as a recording medium, and a removable medium 28 such as an SD card, which can be connected to the HDD 27 as necessary. In the example of FIG. 1, only the GPS receiver 22, the GUI 23, the vehicle sensor 24, the MPEG encoder 26, and the HDD 27 are connected to the controller 21. In addition, they are also connected to the display apparatus 25 in a similar manner so as to be operable (connection signal lines are omitted for simplicity of the drawings because they are not related to the present invention).

On the other hand, a terrestrial digital broadcast receiving apparatus 30 is one of the components that feature the present invention and functions as an "apparatus with a content protection function" in which content is managed in compliance with a copyright protection technology. As shown in FIG. 1, the terrestrial digital broadcast receiving apparatus 30 includes a controller 31, an antenna 32, a tuner 33, an MPEG decoder 34, and an NTSC encoder 35. Furthermore, the NTSC encoder 35 incorporates, as a function block associated with the present invention, a content protection providing unit 36 that functions in cooperation with the controller 31.

The terrestrial digital broadcast receiving apparatus 30 will be described first. In the example of FIG. 1, the configuration thereof is simplified, but in an actual configuration, terrestrial digital TV broadcast waves are often received using two systems in order to improve reception. That is, the respective antennas, the respective tuners, and the respective OFDM (Orthogonal Frequency Division Multiplexing) demodulators of the two systems, and a diversity combiner, an error correction unit, an MPEG2-TS (Transport Stream) demodulator, and a video/audio decoder, which are connected subsequent thereto, are provided. In reference to the configuration of FIG. 1, the circuit block subsequent to the OFDM demodulator up to the video/audio decoder corresponds to the MPEG decoder 34. In the configuration of the two systems, regarding a terrestrial digital TV broadcast wave received by each antenna (antenna 32), a desired broadcast wave is selected via each corresponding tuner (tuner 33). Thereafter, the desired broadcast wave is converted into digital data in an MPEG2-TS format via each corresponding OFDM demodulator and is diversity-combined via the diversity combiner. Furthermore, the diversity-combined digital data in a TS format is subjected to predetermined error detection and correction processes via the error correction unit. Thereafter, the data is separated into a digital video signal and a digital audio signal via the MPEG2-TS demodulator. Furthermore, the signals are decoded by the video/audio decoder and recorded. Each of the output digital signals (video/audio) is input to the NTSC encoder 35.

The NTSC encoder 35 converts the input digital video/audio signal into an NTSC analog video/audio signal and outputs the signal. The digital signal input into the NTSC encoder 35 contains the digital video signal and the digital audio signal of the terrestrial digital TV broadcast wave output from the MPEG decoder 34 at the preceding stage and also contains a digital video signal and a digital audio signal as drive recorder information, which are output from the on-vehicle camera 41 and the microphone 42, respectively. Therefore, the analog signal output from the NTSC encoder 35 also contains two types of NTSC analog video/audio signal in correspondence with a "broadcast wave" and "drive recorder information". However, in the example of FIG. 1, for simplicity, only the signal line (the signal line for NTSC analog camera video and analog audio as drive recorder information) associated with the present invention is shown.

Under the control of the controller 31, the content protection providing unit 36 incorporated in the NTSC encoder 35 performs content protection prescribed by a terrestrial digital broadcast on the digital video/audio data obtained from the on-vehicle camera 41 and the microphone 42 and outputs the digital video/audio data to the navigation system 20. Here, in a form of content protection to be carried out, as prescribed by the standard (ARIB TR-B 14) of a terrestrial digital TV broadcast, the case of analog video output complies with the specification of CGMS-A (Copy Generation Management System) and Macvision, and the case of digital video output complies with the specification of HDCP (High-bandwidth Digital Content Protection system). As a result, it is possible to perform generation management, such as "copying is prohibited", "copying is possible for only one generation", or "copying is allowed with no restrictions". In this embodiment, it is assumed that implementation is performed as "copying is possible for only one generation". Furthermore, in audio output, there are no regulations of content protection with regard to analog audio output, and the case of digital audio output complies with the specification of SCMS (Serial Copy Management System). With regard to digital audio output, it is also possible to perform generation management of copying similarly to the case of video output.

The controller 31 is configured by a microcomputer and basically has a function of controlling processing related to the reception and demodulation of a terrestrial digital TV broadcast wave. Furthermore, the controller 31 has a function of controlling, as processing associated with the present invention, processing related to content protection for obtained data (drive recorder information) and recording and storage of such data on the basis of content protection in cooperation with the controller 21 on the navigation system 20 side. Furthermore, a database of an EPG (Electric Program Guide) (not shown) is attached to the controller 31. The controller 31 has a function of managing the EPG in cooperation with the controller 21 on the navigation system 20 side.

Next, a description of the configuration of the navigation system 20 will be given below.

First, since the GPS receiver 22 is identical to the GPS receiver used in a typical navigation system, the description thereof is omitted. Under the control of the controller 21, a graphical user interface (GUI) 23 is able to operate an EPG database on the terrestrial digital broadcast receiving apparatus 30 side.

The vehicle sensor 24 has various kinds of sensors provided in a typical navigation system and has, in particular, as sensors associated with the present invention, an acceleration sensor, a vibration (shock) sensor, and the like, which are capable of detecting the presence or absence of a shock received by the subject vehicle. An acceleration sensor detects an acceleration (transverse G (gravity)) that occurs in the transverse direction of the vehicle and an acceleration (longitudinal G) that occurs in the longitudinal direction thereof. The acceleration sensor detects a predetermined G or higher when a sudden change of a vehicle speed occurs during driving operation such as sudden braking or at the time of occurrence of an accident such as a collision. When the predetermined G or higher is detected, it is possible for the controller 21 to determine that "a shock has occurred", The vibration (shock) sensor is not ordinarily provided in a navigation system, but is provided in a vehicle in which a security system for achieving safety of a vehicle, such as an airbag, is installed. There are various kinds of vibration (shock) sensors, such as electrostatic types and piezoelectric types, and vibration (shock) sensors detect vibration (shock) that occurs in a car body when the vehicle contacts (collides with) an obstacle or the like.

The display apparatus 25 is formed of an LCD monitor or the like and is disposed at an approximately intermediate position of a center console inside a car. In the example of FIG. 1, on the screen of the display apparatus 25, a TV video output from the terrestrial digital broadcast receiving apparatus 30 is displayed. Of course, under the control of the controller 21, guidance information (a map of the surroundings of the current position of the subject vehicle, a mark indicating the current position of the subject vehicle, a guided route from the position of the subject vehicle to the destination, and the like) related to navigation are also displayed. Under the control of the controller 21 the MPEG encoder 26 performs a digitizing process (a process for conversion into digital data in an MPEG2-TS format) to enable recording in the HDD 27, on an analog signal (NTSC analog video data and analog audio data on which content protection has been performed in compliance with CGMS-A) output from the terrestrial digital broadcast receiving apparatus 30, and outputs the data.

In a storage area of a portion of the HDD 27, drive recorder information is temporarily stored (buffered) under the control of the controller 21, and is recorded and stored under predetermined conditions, as will be described later. That is, video/audio data (furthermore, data that is digitally converted via the MPEG encoder 26 after prescribed content protection is performed via the terrestrial digital broadcast receiving apparatus 30) that is constantly obtained from the on-vehicle camera 41 and the microphone 42, together with at least information on the time at which the data has been obtained (part of "additional data" to be described later), is time-serially stored at a predetermined timing. In this case, the storage capacity of an on-vehicle HDD is limited, and all drive recorder information obtained in the past cannot be stored. Therefore, from the viewpoint of being efficiently utilized, drive recorder information is sequentially stored in the corresponding storage area inside the HDD while being overwritten. For example, by setting 30 seconds as an upper limit, data is stored while being successively updated (buffered).

In another portion of the storage area of the HDD 27, under the control of the controller 21, information based on various kinds of sensor signals obtained from the vehicle sensor 24 and the like is recorded and stored as additional data in such a manner as to be associated with the drive recorder information (video/audio data). Examples of information (additional data) based on various kinds of sensor signals include time information and information on the subject vehicle position, which are obtained from the GPS receiver 22, and information such as an acceleration, a vehicle speed, and the like, which are obtained from the vehicle sensor 24. Furthermore, the information (additional data) includes time information, SI (Service Information), a TOT (Time Offset Table), and the like, which are obtained from the terrestrial digital broadcast receiving apparatus 30.

Furthermore, the HDD 27 is also used as a map database in the navigation system 20. In still another portion of the storage area of the HDD 27, map data (road data for display, for map matching, and for searching for a route, data on various kinds of facilities, and the like) that is divided at a longitude width and a latitude width of an appropriate size according to each scale level is stored.

The controller 21 is configured by a microcomputer or the like. Basically, the controller 21 has functions of controlling various processing related to navigation, such as detection of the subject vehicle position on the basis of the output of the GPS receiver 22, detection of the orientation and the running speed of the subject vehicle on the basis of the output of the vehicle sensor 24, and searching for a guided route from the current position of the subject vehicle to the destination under set search conditions by referring to a map database (HDD 27). Furthermore, as processing associated with the present invention, the controller 21 has a function of controlling processing related to content protection for obtained data (drive recorder information) and recording and storage of the data on the basis of content protection in cooperation with the terrestrial digital broadcast receiving apparatus 30, as will be described later.

Although not particularly shown in FIG. 1, an operation unit, such as a remote controller, for inputting information instructed by the user is connected to the controller 21. The operation unit (remote controller) is provided with various kinds of operation buttons, a joystick, and the like for displaying various kinds of operation screens related to navigation on the display apparatus 25, for selecting various kinds of menus and various kinds of items on the screen, and for executing the selected menu. As a form of the operation unit, in addition to a remote controller, for example, an operation panel provided in a fixed manner on the center console, or a touch panel arranged on the screen of a display apparatus may be used.

Figure 2:
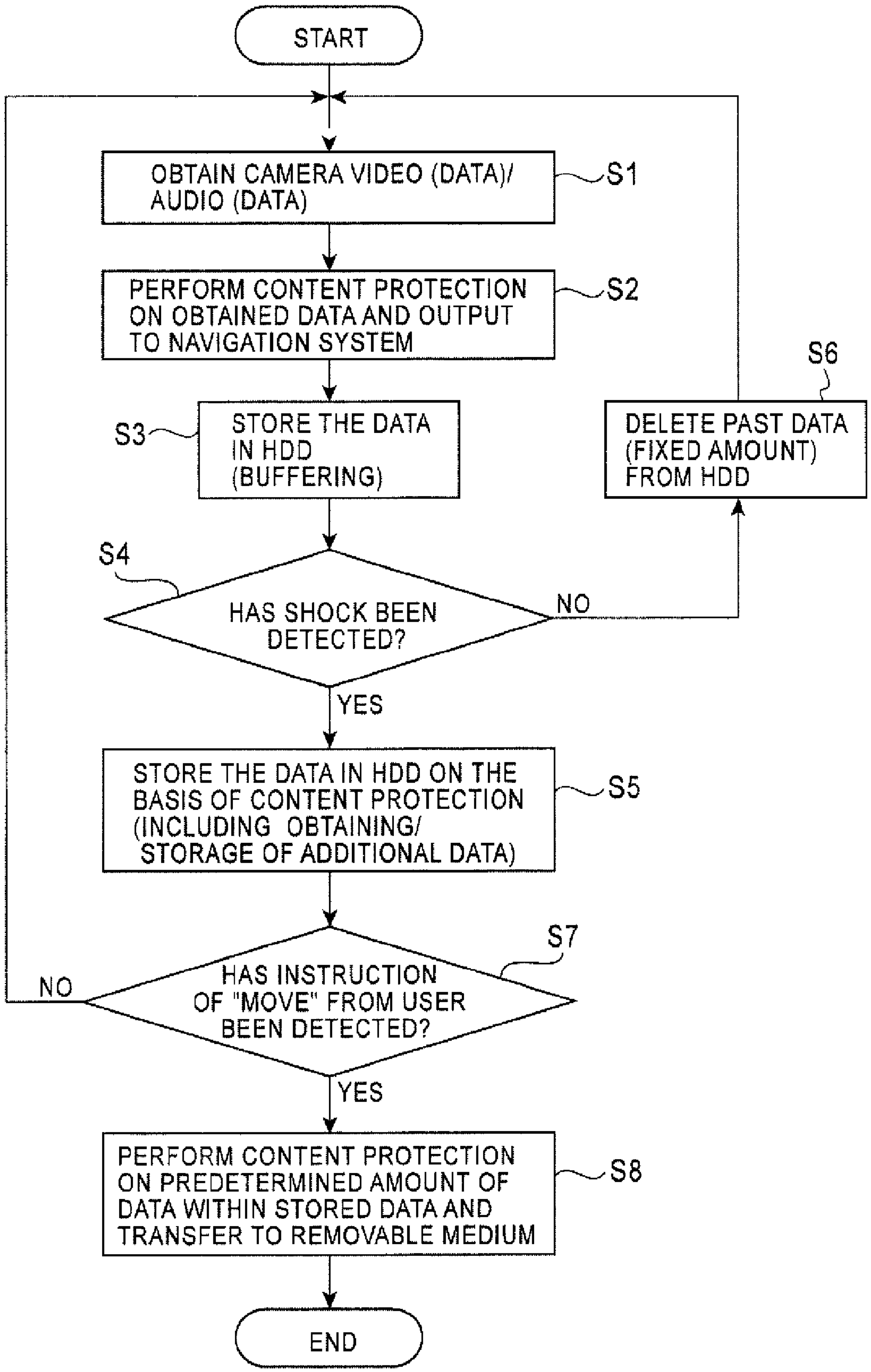
FIG. 2 is a flowchart showing an example of processing related to content protection for obtained data (drive recorder information) and recording and storage of the data on the basis of content protection, which is performed by the system of FIG. 1.

Next, a description will be given, with reference to FIG. 2, of processing related to content protection for obtained data (drive recorder information), which is performed by the drive recorder system 10 according to this embodiment and recording and storage of the data on the basis of content protection. FIG. 2 shows an example thereof. In an initial state, the power supply of the system 10 is assumed to be turned "on".

In this state, in the first step S1, on the terrestrial digital broadcast receiving apparatus 30 side, under the control of the controller 31, data of an image (digital video data) that is image-captured by the on-vehicle camera 41 and data of audio (digital audio data) detected by the microphone 42 are input (obtained) to the NTSC encoder 35. This data input (obtaining) is constantly performed at a predetermined timing interval under the control of the controller 31.

In the next step S2, under the control of the controller 31, the content protection providing unit 36 of the NTSC encoder 35 performs content protection (CGMS-A, HDCP, SCMS) prescribed by a terrestrial digital broadcast in the manner described above on digital video data and digital audio data, which have been obtained from the on-vehicle camera 41 and the microphone 42, respectively, and outputs the data to the navigation system 20 side.

In the next step S3, on the navigation system 20 side, under the control of the controller 21, the content-protected video data and audio data are stored while being buffered in the corresponding storage area of the HDD 27. More specifically, at first, under the control of the controller 21, the MPEG encoder 26 converts the analog video data and audio data output from the NTSC encoder 35 of the terrestrial digital broadcast receiving apparatus 30 into digital data in an MPEG2-TS format. Next, under the control of the controller 21, in the corresponding storage area of the HDD 27, the digital video data and audio data (drive recorder information) on which content protection has been performed is successively stored while being overwritten.

In the next step S4, the controller 21 on the navigation system 20 side determines whether or not a shock has been detected (YES or NO) on the basis of an output signal from the acceleration sensor (the vehicle sensor 24). That is, it is determined whether or not the vehicle having the system 10 installed therein has received a shock due to crash, rear-end collision, or the like. When the determination result is YES, the process proceeds to step S5, and when the determination result is NO, the process proceeds to step S6.

In step S5 (when a shock has been detected), under the control of the controller 21, the data (video/audio data) stored when it is determined that a shock has been received is recorded and stored in the corresponding storage area of the HDD 27 on the basis of the above-described content protection. That is, data that should be maintained as drive recorder information is recorded. At that time, information based on various kinds of sensor signals is obtained from the GPS receiver 22 and the two sensors 24, and time information, SI information, and the like are obtained from the terrestrial digital broadcast receiving apparatus 30. The obtained information together with the video/audio data is stored as "additional data" in the HDD 27.

On the other hand, in step S6 (when a shock has not been detected), under the control of the controller 21, a fixed amount of past data is deleted from the corresponding storage area of the HDD 27 (effective use of the storage area). That is, old data that was stored first within the data (drive recorder information) that was successively stored in the corresponding storage area is deleted. As a result, a storage area corresponding to the amount of the deleted data becomes available, making it possible to store new drive recorder information in the available area. After the completion of the process of this step, the process returns to step S1, and the above-described processing is repeated.

When the process of step S5 (the recording and storage of the drive recorder information on which content protection has been performed) is completed, in the next step S7, the controller 21 on the navigation system 20 side determines whether or not an instruction of "MOVE" from the user has been detected (YES) or not (NO). The instruction from the user can be input, for example, via the GUI 23 or can be input via an operation unit (not shown), such as a remote controller. That is, in step S7, it is determined whether or not transfer ("MOVE") of data (part of the drive recorder information) from the HDD 27 to the removable medium 28 has been instructed. Then, when the determination result is YES, the process proceeds to step S8. When the determination result is NO, the process returns to step S1, and the above-described processing is repeated.

That is, when the determination result is NO, while the recording and storage of the data in the HDD 27 is being performed in step S5, digital video/audio data is constantly received by the terrestrial digital broadcast receiving apparatus 30 from the on-vehicle camera 41 and the microphone 42. Therefore, during this time, the processing of steps S1 to S6 is repeated.

In the final step S8 (when an instruction of "MOVE" has been issued), on the navigation system 20 side, under the control of the controller 21, a predetermined amount of data (for example, data for 15 seconds before and after it is determined that a shock has been detected) is extracted from within the drive recorder information (video/audio data) that is recorded and stored in the corresponding storage area of the HDD 27. Content protection (Content Protection for Recordable Media (CPRM)) is performed on the extracted data on the basis of generation management information contained in the data. Then, the data is transferred "MOVED" to the removable medium 28 (an SD card or the like). In this example, since implementation is performed as "Copying is possible for only one generation", the video/audio data stored once on the removable medium 28 cannot be copied or tampered with (guarantee of content protection).

As has been described above, according to the configuration of the drive recorder system 10 according to this embodiment, prescribed content protection is performed on the digital video data and the digital audio data (data that should be recorded and stored as drive recorder information), which have been obtained from the on-vehicle camera 41 and the microphone 42, via the terrestrial digital broadcast receiving apparatus 30 in which content is managed in compliance with a copyright protection technology. Thereafter, the video/audio data on which content protection has been performed is output to the navigation system 20 side. On the navigation system 20 side, while the data on which content protection has been performed is output to the outside from the system 10, the data is recorded and stored as "drive recorder information" in the corresponding storage area of the HDD 27 via the MPEG encoder 26. Furthermore, when drive recorder information (video/audio data) is to be recorded and stored, additional data (time information, position information, various kinds of sensor information, and the like) associated with the drive recorder information is also recorded and stored.

Figure 3:
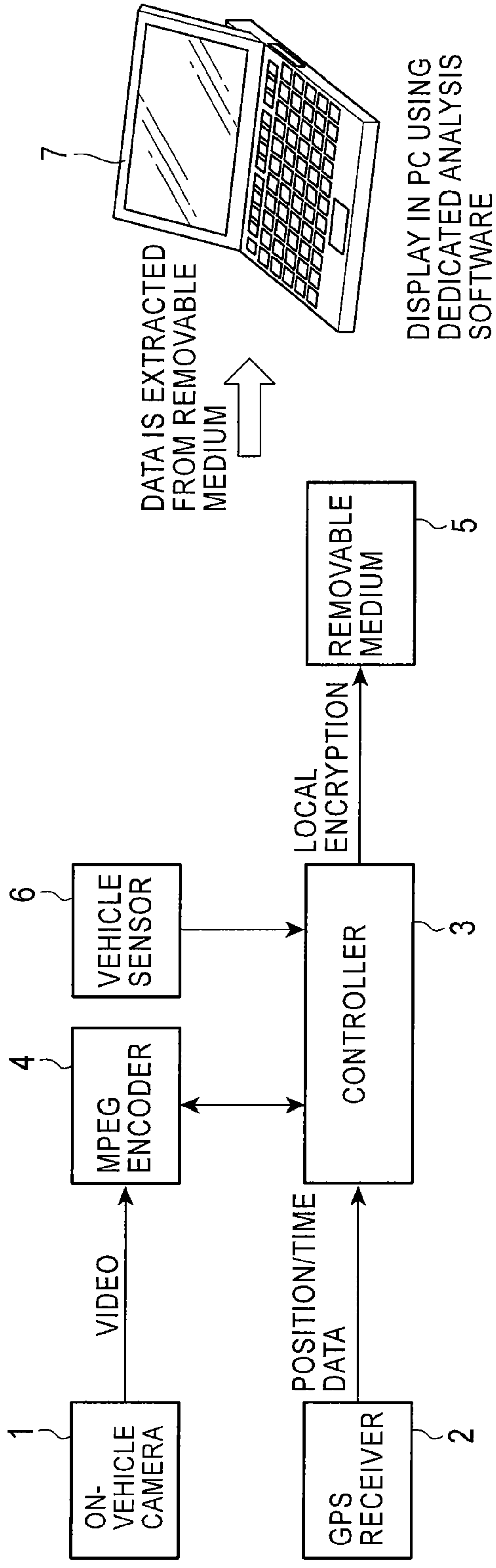
FIG. 3 PRIOR ART
FIG. 3 is an illustration of a drive recorder system of the related art.

In the manner described above, content protection is performed on both the video/audio data stored as drive recorder information on the recording medium (HDD 27) and the video/audio data that is output to the outside from the system 10 in compliance with a content protection technology used by a terrestrial digital broadcast. Therefore, it is possible to ensure a fixed level of security of the obtained data. When compared with the case in which a specialized encryption method is used as seen in the related art (FIG. 3), actual implementation is possible within the standard of a terrestrial digital broadcast. Therefore, substantial maintenance and management and the like on the manufacturer side is not necessary, thereby contributing to a reduced cost. That is, by sharing the content protection technology implemented by a terrestrial digital broadcast with a navigation system and by only adding minimum necessary devices (in this case, the on-vehicle camera 41 and the microphone 42), it is possible to provide a drive recorder system in which a fixed level of security is guaranteed.

According to the configuration of this embodiment, a GUI (Graphical User Interface) is able to share the system with a terrestrial digital broadcast. Therefore, even if a content navigation dedicated to a drive recorder is not developed, by handling the system as video/audio content in the same manner as for a TV program, the system of the EPG implemented in a terrestrial digital broadcast can be shared. More specifically, as additional data of video/audio content, additional data based on a title, time, detailed description, and other SI information (an event information table (EIT)) can be added and managed.

In the above-described embodiment, a description has been given by using the case of the terrestrial digital broadcast receiving apparatus 30 as an example of an "apparatus with a content protection function" in which content is managed in compliance with a copyright protection technology. As is clear from the scope and spirit of the present invention (prescribed content protection is performed on data that should be stored as drive recorder information and thereafter is recorded and stored on a recording medium), of course, examples of the apparatus with a content protection function are not limited to apparatuses of a broadcast system. For example, in disk medium apparatuses, such as DVD playback apparatuses, content is managed in compliance with a copyright protection technology in a similar manner.

Therefore, the present invention can be applied to disk medium apparatuses in a similar manner. In this case, the configuration is basically the same as the configuration shown in FIG. 1, and practically differs in that a DVD drive is disposed in place of the antenna 32 and the tuner 33. Regarding the type of content protection, CPPM (Content Protection for Prerecorded Media) is used in place of CPRM in the above-described embodiment.

In the above-described embodiment, a description has been given by using an example in which a drive recorder system according to the present invention is incorporated as part of the navigation system 20. As is clear from the scope and spirit of the present invention, of course, a navigation system does not necessarily need to be installed in a vehicle having the system installed therein. In summary, as long as the system is configured to include means (the on-vehicle camera 41 and the microphone 42 in FIG. 1) for obtaining drive recorder information (video/audio data), a recording medium (the HDD 27 in FIG. 1) for recording and storing data drive recorder information, and means (the terrestrial digital broadcast receiving apparatus 30 in the embodiment in FIG. 1) for performing prescribed content protection on data before the data is recorded and stored on the recording medium, the present invention can be applied in a similar manner.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A drive recorder system comprising:

an on-vehicle camera configured to constantly obtain an image of the surroundings of a subject vehicle;

a recording medium for recording drive recorder information;

an apparatus comprising a content protection providing unit with a content protection function which manages content in compliance with a copyright protection technology, wherein the apparatus is one of a broadcast receiving apparatus and a pre-recorded medium playback apparatus, and the content protection providing unit receives the obtained image data from the on-vehicle camera; and a controller configured to control the content protection providing unit to perform the content protection function on the obtained image data received from the on-vehicle camera, and the image data is recorded and stored on the recording medium.

2. The drive recorder system according to claim 1, further comprising a microphone configured to detect sound that is generated in the surroundings of the subject vehicle, wherein the controller controls the content protection providing unit to perform the content protection function on the audio data detected by the microphone, and the audio data is recorded and stored on the recording medium.

3. The drive recorder system according to claim 2, wherein the controller causes the image and audio data on which content protection has been performed to be successively stored on the recording medium while buffering the data.

4. The drive recorder system according to claim 3, further comprising a vehicle sensor configured to output signals indicating a state of the subject vehicle, the vehicle sensor including a sensor capable of detecting at least the presence or absence of a shock received by the subject vehicle, wherein the controller determines whether or not the subject vehicle has received a shock on the basis of an output signal from the sensor, and when the controller determines that a shock has been received, the controller causes the data stored at the time of the determination to be recorded and stored as drive recorder information on the recording medium.

5. The drive recorder system according to claim 4, wherein, when the controller determines that a shock has not been received on the basis of an output signal from the sensor, the controller causes a fixed amount of data that is stored first within the data stored at the time of the determination to be deleted from the recording medium.

6. The drive recorder system according to claim 4, wherein, when the data stored at the time of the determination is to be recorded and stored as drive recorder information on the recording medium, the controller causes information on at least the time at which the data has been obtained to be recorded and stored as additional data together with the drive recorder information.

7. The drive recorder system according to claim 6, wherein, when the controller is incorporated in such a manner as to be shared with part of a navigation system including a global positioning system receiver, the controller obtains information on the time that is to be recorded and stored as the additional data on the recording medium from the global positioning system receiver.

8. The drive recorder system according to claim 7, wherein the controller also causes information on the current position of the subject vehicle, which is obtained from the global positioning system receiver, to be recorded and stored on the recording medium as additional data.

9. The drive recorder system according to claim 7, wherein the recording medium is shared with a recording medium storing map data in the navigation system.

10. The drive recorder system according to claim 6, wherein, when the controller is incorporated in such a manner as to be shared with part of a terrestrial digital broadcast receiving apparatus that functions as the apparatus with a content protection function, the controller obtains, from the terrestrial digital broadcast receiving apparatus, information on the time that is to be recorded and stored as the additional data on the recording medium.

11. The drive recorder system according to claim 6, wherein the controller also causes information based on a signal output from the vehicle sensor to be recorded and stored as additional data on the recording medium.

12. The drive recorder system according to claim 6, further comprising:

a removable medium that can be connected to the recording medium; and a graphical user interface configured to receive an instruction from a user, wherein, when the controller detects an instruction from the user via the graphical user interface, the controller extracts a predetermined amount of data from within the drive recorder information recorded and stored on the recording medium, performs prescribed content protection on the extracted data on the basis of generation management information contained in the data, and causes the data to be stored on the removable medium.

13. The drive recorder system according to claim 2, wherein the controller performs content protection prescribed by the apparatus with a content protection function on each of image data obtained by the on-vehicle camera and audio data detected by the microphone, and causes the image data and the audio data to be directly output to the outside.

14. The drive recorder system according to claim 1, wherein the apparatus with a content protection function is a terrestrial digital broadcast receiving apparatus.

15. The drive recorder system according to claim 1, wherein the apparatus with a content protection function is a digital versatile disc playback apparatus.

* * * * *